(12) United States Patent
Berger et al.

(10) Patent No.: US 7,082,361 B2
(45) Date of Patent: Jul. 25, 2006

(54) ELECTRONIC SPEED CONTROL SYSTEM FOR FARM MACHINES

(75) Inventors: John G. Berger, Landisville, PA (US); Jeremy Daniel Peters, New Holland, PA (US); James T. Clevenger, Jr., Lancaster, PA (US); Philip J. Ehrhart, Narvon, PA (US); Richard P Strosser, Akron, PA (US); Christopher A. Foster, Winchester (NZ)

(73) Assignee: CNH America LLC, New Holland, PA (US)

( * ) Notice: Subject to any disclaimer, the term of this patent is extended or adjusted under 35 U.S.C. 154(b) by 166 days.

(21) Appl. No.: 10/774,794

(22) Filed: Feb. 9, 2004

(65) Prior Publication Data

US 2005/0177297 A1 Aug. 11, 2005

(51) Int. Cl.
B60T 8/32 (2006.01)

(52) U.S. Cl. ........................................ 701/93

(58) Field of Classification Search ............... 701/93; 180/53.5; 172/303
See application file for complete search history.

(56) References Cited

U.S. PATENT DOCUMENTS 5,576,962 A * 11/1996 Ferguson et al. ........... 701/101
6,305,486 B1 * 10/2001 Polzin et al. ............... 180/308

* cited by examiner

Primary Examiner—Thu V. Nguyen
(74) Attorney, Agent, or Firm—Stephen A. Bucchioneri; John William Stader; Michael C. Harms

(57) ABSTRACT

The apparatus is an electronic speed control for farm machines. A microprocessor is fed data on the tractor engine speed, the tractor ground speed, and the manual speed lever setting, and electronically matches the desired ground speed to the engine speed to prevent stalling the engine. Ground speed is controlled by using the microprocessor to electrically vary a control valve that replaces the usual mechanical linkage between the speed control lever and the hydraulic pumps driving the hydraulic wheel motors.

5 Claims, 2 Drawing Sheets

ELECTRONIC SPEED CONTROL SYSTEM FOR FARM MACHINES

BACKGROUND OF THE INVENTION

This invention deals generally with farm machinery and more specifically with an electronic speed control for self propelled farm machines.

It is quite interesting that large self propelled farm machines are not all powered or steered in the same manner as the road vehicles with which we are familiar. Such machines are not powered by direct mechanical linkages from the engine to the drive wheels, and are not steered by changing the angle of the vertical planes of the wheels. The wheels of many such self propelled farm machines, including large farm tractors, are coupled to their engines by hydraulic systems. The engine directly drives hydraulic pumps, and those pumps are connected by hoses to hydraulic motors that are located at and turn the wheels. Wheel speed is then controlled by changing the quantity of hydraulic fluid that the pump delivers to the wheel motor. Furthermore, to reverse the motion of the hydraulic motor and thus reverse the direction of the wheel the direction of the hydraulic fluid flow is reversed.

It is even more interesting to note that the steering of such self propelled farm machines is accomplished by the very same system as the speed and forward and reverse directional control. The very large wheels of such equipment are not steered as automobile wheels are, but instead, the direction of the machine is changed by driving the wheels at different rotational speeds. Thus, for a typical self propelled farm machine with two forward drive wheels and two caster type smaller rear wheels, if the right forward wheel is stopped and the left forward wheel is rotated forward, the tractor will turn toward the right. In fact, if instead of being stopped, the right forward wheel is rotated in reverse at the same speed the left wheel is rotated forward, the tractor will turn right around the center of its own wheel axis.

Typically, the speeds of the wheels have been controlled by the machine operator using a lever with a direct mechanical linkage to a speed control rod interconnected with the two hydraulic pumps, one each for the right and the left wheels. The steering control also acts on these same two hydraulic pumps. The steering wheel is used to rotate the speed control rod that is connected to the pump interconnection linkages. The rotation of the speed control rod is around its own axis, and the pump linkages themselves are connected to the control rod by oppositely threaded collars. Thus, when the speed control rod is rotated, the pump linkages either come closer together or farther apart, depending upon the direction of rotation. This change in the spacing of the pump linkages changes their response to the motion of the speed control rod, and thus causes the right and left wheels to operate at different speeds and the farm machine to turn.

There is a significant trend in the farm equipment industry to automate farm equipment. It is particularly advantageous for very large fields to operate these machines under conditions where their speed is held closely to a setting set by the operator. In effect, it means placing self propelled farm machines in a "cruise control" mode. However, farm machines are subjected to rapidly occurring and widely varying load conditions that make any speed control difficult, and automatic speed control particularly difficult. One example is the condition of a machine suddenly coming under full load and therefore causing the engine to slow down, but instead being asked by either an automatic control system or an operator to regain speed. Such a condition is particularly likely when a machine includes an automatic speed control that quickly recognizes only that the machine is slowing down from the selected speed, and therefore automatically attempts to increase the speed. Under such conditions the engine, which is already fully loaded, will stall unless the operator intercedes and actually reduces the speed setting. With automatic speed controls becoming much more common for the large machines, it would be very desirable to have a control system that not only regulates the machine ground speed based on a control setting by the operator, but would also assure that no situation arises that causes the engine to stall because of loading.

SUMMARY OF THE INVENTION

The particular system of powering and steering self propelled farm machines by hydraulic motors at the wheels provides an opportunity for much improved vehicle speed control. The preferred embodiment of the invention uses a microprocessor to evaluate all the conditions to which the machine is subjected and to adjust the machine ground speed in a manner and at a rate that prevents stalling the engine. Furthermore, the present invention, although including the ability to accurately return to a desired previous speed, maintains the ground speed based upon the operator's speed control lever setting.

It should be appreciated that in the preferred embodiment of the invention the operator's speed control lever is not what we are accustomed to in an automobile. The farm machinery's speed control lever is not at all like an accelerator pedal and much more like a console gear shift lever. Thus, the operator actually sets a speed control lever position to set the desired ground speed of the machine, and that lever is not spring loaded, but holds its position until it is manually moved.

In the preferred embodiment of the invention, this lever setting is read by a speed control position sensor and an appropriate electrical signal is sent to the on-board microprocessor. The microprocessor then sends a related signal to a control valve that controls the hydraulic pressure to and the direction of movement of a speed control hydraulic cylinder that is attached to the prior art speed control rod. This is the same speed control rod which, in the prior art systems, is directly mechanically linked to the operator's speed control lever and controls the hydraulic pumps that feed the hydraulic motors driving the wheels.

The significant benefit of the insertion of a system of microprocessor driven electrical and hydraulic controls into the previous direct mechanical linkage is the ability to now control the machine speed based upon multiple parameters. For example, by using a ground speed sensor means with its signal supplied to the microprocessor, the microprocessor can more accurately maintain the ground speed based on the operator's speed control lever position. Previously, if the machine began slowing down, for instance, because of a hill, it was the operator who was required to adjust the speed control lever to a higher speed. In the present invention, the microprocessor senses the slowing down and quickly, certainly much faster than an operator could, increases the power to the wheels. The benefit of the present invention is that the operator's speed control lever becomes a control that can be labeled for precise ground speed settings, not merely, as in the prior art, a control to adjust the power output of the engine.

With the present invention, after a long straight run down a field at a prescribed speed, the speed control lever is typically reset to a lower speed for turning the machine around in the "headlands" at the end of the field. Any movement of the speed control lever outside of a specified narrow range is interpreted by the controller as an operator input requiring a new closed loop speed. Then, once the turn is completed, the operator moves the speed control lever forward to return the machine to a closed loop value near the speed value prior to entering the headlands.

Thus, by using an intuitive action by the operator, the new speed value as determined by the operator will be maintained as the newly regulated speed value by the controller.

Another significant benefit of the microprocessor and hydraulically controlled speed is the ability to dynamically adjust to load conditions. Field load condition variations may be crop density variations or terrain elevation changes, but are not limited to these two conditions. Various types of sensors are connected to the controller to report such load conditions during operation.

If the engine is operating at conditions requiring near maximum power, it is possible that increased field load conditions could stall the engine. In such cases, the controller is programmed to autonomously reduce speed value and thus, engine load, until less demanding field load conditions prevail. When sensors report that lighter load conditions are encountered, the controller will return the speed to the previous value.

The present invention thereby not only provides a fast response automatic speed control for self propelled farm machines, but also accommodates to all load conditions.

DETAILED DESCRIPTION OF THE INVENTION

Figure 1:
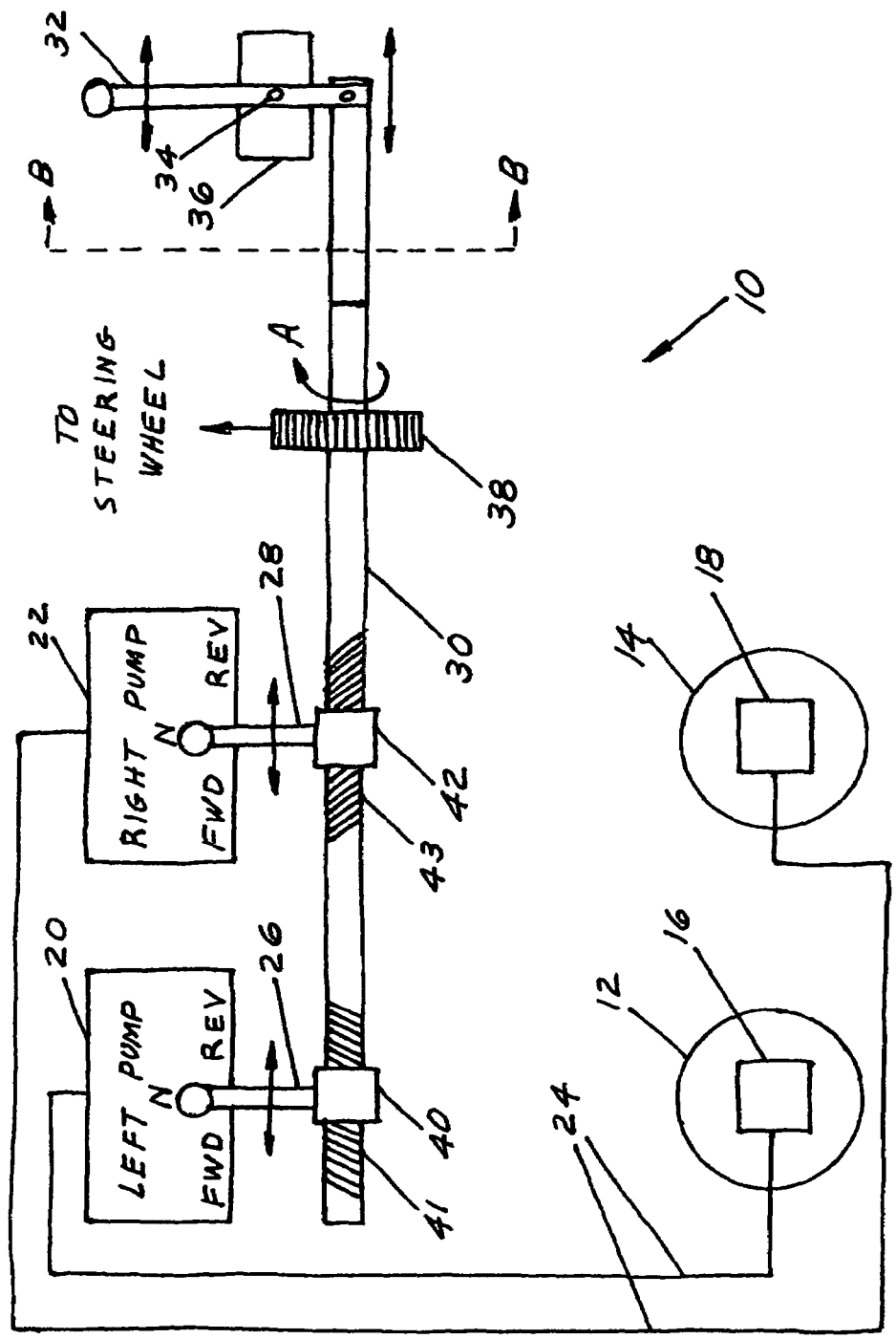
FIG. 1 is a simplified block diagram of the prior art manual steering and speed control apparatus of a typical self propelled farm machine.

FIG. 1 is a simplified block diagram of the manual steering and speed control apparatus 10 of a typical self propelled farm machine. Motive power is delivered to left wheel 12 and right wheel 14 by hydraulic motors 16 and 18, respectively. Hydraulic motors 16 and 18 are themselves powered from left hydraulic pump 20 and right hydraulic pump 22, which are mechanically powered from the machine's engine (not shown) by conventional mechanical linkages (not shown).

Left pump 20 and right pump 22 supply hydraulic fluid under pressure to wheel motors 16 and 18 through hydraulic lines 24. Each of pumps 20 and 22 has the capability of rotating its associated wheel motor so that the powered wheel will go forward or in reverse, and if the pump is in its neutral setting, to not power the wheel at all. The three settings of pumps 20 and 22 are indicted in FIG. 1 as "FWD", "REV", and "N". Moreover, pumps 20 and 22 are not simple on and off devices, but their fluid outputs vary with the position of their control arms 26 and 28. Thus, the farther each control arm 26 and 28 is moved away from the neutral position, the greater is the power delivered to the associated hydraulic motor and wheel.

Control arms 26 and 28 are both attached to speed control rod 30, and speed control rod 30 is displaced axially, in the so called "common mode", by speed control lever 32 that the machine operator moves. Speed control lever 32 is a simple lever that pivots on pin 34 attached to a point on machine chassis 36 and to a pivoting link on speed control rod 30. With that simple mechanical linkage, as the operator moves speed control lever 32, control arms 26 and 28 change the status of pumps 20 and 22 and vary the power delivered to wheels 12 and 14. When, as shown in FIG. 1, control arms 26 and 28 are parallel, pumps 20 and 22 respond equally to movement of speed control lever 32 and wheels 12 and 14 move in the same direction and at the same speed so that the machine moves straight ahead.

However, typically the steering system of the machine is also controlled by pumps 20 and 22. To change the direction of such a farm machine, the speeds of drive wheels 12 and 14 are made to be different from each other, with one wheel turning slower than the other. This is accomplished by making left pump 20 and right pump 22 deliver different quantities of hydraulic fluid to their respective wheel motors, which can be accomplished by rotating a conventional steering wheel (not shown).

The rotation of such a steering wheel is mechanically transmitted to rotational drive 38 attached to and capable of rotating speed control rod 30. Rotational drive 38 can typically be a gear linked to the steering wheel. As previously described, axial motion of speed control rod 30 moves control arms 26 and 28 that control the power that pumps 20 and 22 deliver to their respective wheel motors, arid as long as control arms 26 and 28 are oriented in parallel, the power delivered to the wheel is equal. However, control arms 20 and 22 are attached to speed control rod 30 by threaded collars 40 and 42 that engage thread sets 41 and 43 respectively, and thread sets 41 and 43 have oppositely directed threads. Thus, the rotation of speed control rod 30, referred to as the "differential mode", changes the effect of the axial position of speed control rod 30 on pumps 20 and 22, and thus changes the speed of wheels 12 and 14.

For example, assuming a farm machine has its manual steering and speed control apparatus 10 set as shown in FIG. 1, that is, both control arms have their pumps set in Neutral position. Then, rotating speed control rod 30 in the direction indicated by arrow "A" would cause control arm 26 to move toward the "Forward" setting of left pump 20 and control arm 28 to move toward the "Reverse" setting of right pump 22. If engine power were then applied to both pumps, left wheel 12 would rotate for forward movement and right wheel 14 rotate for reverse movement. This action would actually cause the machine to rotate to the right around the central point of the axle between the right and left wheels. This same effect will occur when both pumps are set for forward motion, except that rotating speed control rod 30 will then cause one wheel to rotate faster and the other to slow down. This will then cause the machine to turn.

Figure 2:
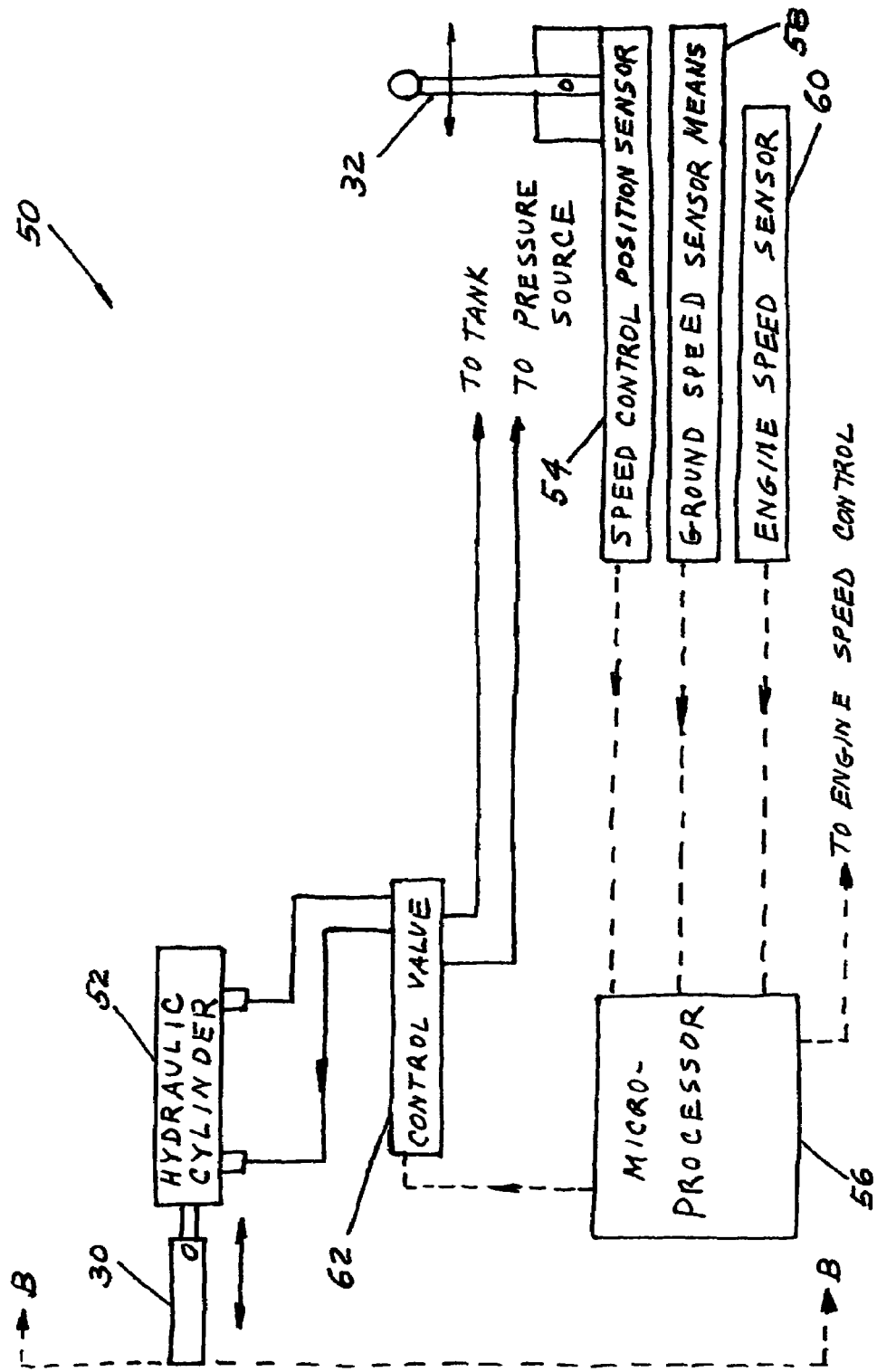
FIG. 2 is a simplified block diagram of the automatic speed control apparatus of the preferred embodiment of the invention.

FIG. 2 is a simplified block diagram of automatic speed control apparatus 50 of the preferred embodiment of the invention which is used in conjunction with the prior art steering and speed control apparatus shown in FIG. 1. To operate automatic speed control apparatus 50 with the prior art apparatus of FIG. 1, automatic speed control apparatus 50 is inserted between speed control rod 30 and speed control lever 32 to the left of the separation point indicated by the dashed line B—B in FIG. 1.

As shown in FIG. 2, speed control rod 30 is then moved axially by hydraulic cylinder 52, and speed control lever 32 is interconnected with speed control position sensor 54. Speed control position sensor 54 indicates the position at which speed control lever 32 has been set, and speed control position sensor 54 is only one of several sensors from which microprocessor 56 derives information. Two other sensors interconnected with and supplying signals to microprocessor 56 are ground speed sensor means 58 and engine speed sensor 60.

These sensors are all conventional devices. For instance, in the preferred embodiment of the invention speed control position sensor 54 is a dual hall effect rotary position sensor, ground speed sensor means 58 is a reluctance sensor on each wheel, and engine speed sensor 60 for four cylinder engines is an alternator signal and for six cylinder engines is a magnetic sensor. Each of these devices supplies an appropriate electronic signal to microprocessor 56, which then interprets the conditions of the machine and takes action according to its internal program.

When the machine operator sets speed control lever 32 to any particular position for a specific machine speed, speed control position sensor 54 provides a signal to microprocessor 56, and under normal conditions, microprocessor 56 provides appropriate signals to control valve 62. Based on the signals received from microprocessor 56, control valve feeds hydraulic pressure to hydraulic cylinder 52, and speed control rod 30, which is attached to hydraulic cylinder 52 is moved accordingly. FIG. 2 depicts a typical hook up in which pressure from control valve 62 moves hydraulic cylinder 52 and speed control rod 30 toward the right, and thus, based on the previous description of FIG. 1, reduces the wheel speed of the machine. Similarly control valve 62 causes hydraulic cylinder 52 and speed control rod 30 to move to the left to increase wheel speed.

Programmed microprocessor 56, with information received from ground speed sensor means 58 and engine speed sensor 60, actually controls the ground speed to maintain the speed set by the operator and it also controls the engine speed of the machine to assure that there is enough power to do so. However, when, due to increasing load conditions, more power is needed than the engine can supply, a condition that would normally cause the engine to stall, rather than attempting to increase the speed of the engine, microprocessor 56, based on its program, lowers the ground speed of the machine to counteract the increased load. This is exactly what a well experienced operator would do in regard to engine overloading based on his own sensory inputs for sound and vibration in the machine.

Of course, the present invention can be used by even an inexperienced operator, and automatic speed control apparatus 50 also has the advantage of automatically returning to the preset ground speed as soon as load and engine conditions will permit.

Another feature available by the use of microprocessor 56 is that a previous speed setting is retained in memory.

The present invention thereby not only provides a fast response automatic speed control that does not require the skill of a highly trained operator, but also provides an automatic speed control that adjusts to varying load conditions.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, different sensors could be used for any of the parameters as long as the sensor output can be modified to furnish appropriate input signals to microprocessor 56. Furthermore, hydraulic cylinder 52 and control valve 62 could be replaced by an electrical speed control power apparatus to provide and control the axial motion of speed control rod 30. Moreover, speed control lever 32 can also be replaced with some other type of control.

What is claimed as new and for which Letters patent of the United States are desired to be secured is:

1. An electronic speed control system for a farm machine comprising:

at least one left wheel and one right wheel installed on the farm machine, with first and second variable speed, reversible, hydraulic motors connected to and providing power to respective left and right wheels;

first and second variable output and reversible hydraulic pumps connected to respective first and second hydraulic motors and driven by an engine on board the farm machine, with each first and second hydraulic pump capable of being set to drive its connected motor forward or reverse or into neutral with no motion and of varying the motor speed in forward and reverse by varying the output of the respective first or second hydraulic pump;

first and second pump control devices connected to respective first and second hydraulic pumps to independently select between forward, reverse, and neutral pump settings and to vary the output of the first and second pumps in the forward and reverse settings;

a speed control device connected to both first and second pump control devices and capable of simultaneously varying the settings and outputs of both first and second pumps;

a speed control power apparatus connected to the speed control device and capable of moving the speed control device to vary the outputs of both first and second pumps;

a plurality of sensors located on the farm machine for establishing various operational parameters and generating signals indicative thereof;

a microprocessor interconnected with the speed control power apparatus and providing a signal to the speed control power apparatus to determine the motion imparted to the speed control device based upon a program of the microprocessor and the signals from the plurality of sensors that are interconnected with the microprocessor;

one of the plurality of sensors is a speed control position sensor comprised of a dual hall effect rotary position sensor interconnected with an operator controlled manual speed control and with the microprocessor and sending a signal to the microprocessor indicating at what speed setting the manual speed control is set;

another of the plurality of sensors is an engine speed sensor comprised of a magnetic sensor interconnected with the engine and with the microprocessor and sending a signal to the microprocessor indicating at what rpm the engine is running; and yet another of the plurality of sensors is a ground speed sensor comprised of a reluctance sensor on each wheel, each interconnected with the microprocessor and sending a signal to the microprocessor indicating the ground speed of the farm machine, whereby the program of the microprocessor will cause the ground speed of the farm machine to be reduced when the engine rpm decreases.

2. The electronic speed control system of claim 1 wherein the operator controlled manual speed control is a pivoted lever.

3. The electronic speed control system of claim 2 wherein the speed control power apparatus is a hydraulic cylinder connected to and operated by a control valve connected to and receiving signals from the microprocessor.

4. The electronic speed control system of claim 3 wherein the pump control devices are control arms connected to the pumps and to the speed control device.

5. The electronic speed control system of claim 4 wherein the speed control device is a rod connected between the pump control devices and the speed control power apparatus.

* * * * *